(12) United States Patent
Matsushita

(10) Patent No.: US 9,430,026 B2
(45) Date of Patent: Aug. 30, 2016

(54) ELECTRONIC CONTROL DEVICE AND MICROCOMPUTER CONTROL METHOD

(75) Inventor: Naoki Matsushita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 14/345,873

(22) PCT Filed: Nov. 9, 2011

(86) PCT No.: PCT/JP2011/075801
§ 371 (c)(1),
(2), (4) Date: Mar. 19, 2014

(87) PCT Pub. No.: WO2013/069103
PCT Pub. Date: May 16, 2013

(65) Prior Publication Data
US 2014/0245049 A1    Aug. 28, 2014

(51) Int. Cl.
    *G06F 1/32*    (2006.01)
(52) U.S. Cl.
    CPC ........... *G06F 1/3234* (2013.01); *G06F 1/3228* (2013.01); *G06F 1/3253* (2013.01); *Y02B 60/1235* (2013.01); *Y02B 60/32* (2013.01)
(58) Field of Classification Search
    CPC ...... G06F 1/3202; G06F 1/3231; G06F 1/26; G06F 1/206; G06F 1/3228; G06F 1/08; G06F 1/3289; G06F 1/266; H04L 12/12; H04L 12/10
    See application file for complete search history.

(56) References Cited

U.S. PATENT DOCUMENTS

| | | | | |
|---|---|---|---|---|
| 5,872,903 | A * | 2/1999 | Iwata | G06F 1/26 711/E12.022 |
| 8,041,973 | B2 * | 10/2011 | Smit | G06F 1/3215 713/320 |
| 2004/0199803 | A1 * | 10/2004 | Suzuki | G06F 1/3203 713/400 |
| 2005/0138454 | A1 * | 6/2005 | Darmawaskita | G06F 1/24 713/323 |
| 2005/0160301 | A1 | 7/2005 | Disser | |
| 2008/0172568 | A1 * | 7/2008 | Yoon | G06F 1/32 713/323 |
| 2010/0305723 | A1 | 12/2010 | Koyama | |
| 2012/0102344 | A1 * | 4/2012 | Kocev | G06F 1/3237 713/322 |

FOREIGN PATENT DOCUMENTS

| | | |
|---|---|---|
| DE | 10 2004 008 543 A1 | 9/2005 |
| JP | A-09-237239 | 9/1997 |
| JP | A-2000-010907 | 1/2000 |
| JP | A-2003-188862 | 7/2003 |
| JP | A-2008-123538 | 5/2008 |
| JP | A-2010-278959 | 12/2010 |

* cited by examiner

*Primary Examiner* — Zahid Choudhury
(74) *Attorney, Agent, or Firm* — Oliff PLC

(57) ABSTRACT

Provided are an electronic control device and a microcomputer control method not only enabling smooth transmission and reception of signals by using a plurality of microcomputers but also capable of achieving, with a simpler configuration, reduction of power consumed by the microcomputers. As a mode for reducing power consumption, the electronic control device brings microcomputers from which a sleep request has been issued into a sleep state. The electronic control device is equipped with a low power consumption mode for bringing a communication bus driver into the sleep state after all microcomputers constituting the electronic control device have been transferred into the sleep state.

15 Claims, 11 Drawing Sheets

ELECTRONIC CONTROL DEVICE AND MICROCOMPUTER CONTROL METHOD

FIELD OF THE DISCLOSURE

The present invention relates to an electronic control device having microcomputers, and a method of controlling the microcomputers.

BACKGROUND OF THE DISCLOSURE

Typically in vehicles such as automobiles, many electronic control devices are installed. A leading example of such electronic control devices is an electronic control device that forms a part of a navigation system, and other examples are electronic control devices for use in controlling a variety of in-vehicle devices (e.g., the engine and the brakes) with microcomputers or for use in controlling condition display devices adapted to display a variety of vehicle conditions (e.g., the meters). In such vehicles, these electronic control devices are electronically connected with one another by communication lines to form a vehicle network. Through such vehicle network, a variety of vehicle data is transmitted and received between the electronic control devices.

As disclosed in Patent Document 1, microcomputers have been proposed that is switched to a power saving mode (i.e., a mode during which power consumption is reduced by stopping the oscillation of the clock signal while maintaining the internal conditions) when there is no need for microcomputers to conduct any processing (e.g., when the vehicle is stopped). In such electronic control device having microcomputers switchable to a power saving mode, the microcomputers are switched between the power saving mode and the normal power mode in accordance with the vehicle conditions, such that the power consumed in the electronic control device is reducible.

PRIOR ART DOCUMENTS

Patent Documents

Patent Document 1: Japanese Laid-Open Patent Publication No. 2008-123538

SUMMARY OF THE INVENTION

Problems that the Invention is to Solve

In recent years, the number of the electronic control devices installed in a vehicle has been increased in accordance with the advance of the vehicle performance. Since the increase in the number of the electronic control devices connected to the vehicle network increases the length of the wiring paths of the communication lines, designing of the paths while securing the communication quality may become complicated or the communication quality may be reduced.

With the above background, it has been proposed that microcomputers (control circuits) 50$a$ and 50$b$, each of which is usually provided per electronic control device, be provided altogether to a single electronic control device 10 as depicted in, for instance, FIG. 12. In the electronic control device 10 having the microcomputers 50$a$ and 50$b$, the microcomputers 50$a$ and 50$b$ share a single transceiver 30 for transmitting and receiving vehicle data.

However, in a configuration where the transceiver 30 is shared as described above, an arbiter 20 adapted to arbitrate the control signals output from the microcomputers 50$a$ and 50$b$ needs to be provided between the transceiver 30 and the microcomputers 50$a$ and 50$b$. Further, in order to provide the power saving function to the electronic control device 10 having the microcomputers 50$a$ and 50$b$, the electronic control device 10 needs to perform a process for switching the microcomputers 50$a$ and 50$b$ to the power saving mode, which requires the arbiter 20 to have more advanced functions. In other words, the configuration where the transceiver 30 is shared by the microcomputers complicates the configuration of the electronic control device.

The problems described above are not unique to electronic control devices for use in vehicles, but almost common to any electronic control devices having microcomputers.

Accordingly, it is an objective of the present invention to provide an electronic control device and a method of controlling microcomputers, according to which signals from a plurality of microcomputers are smoothly transferred; and the power consumed by the microcomputers is reduced with a simple configuration.

Means for Solving the Problems

To achieve the foregoing objective and in accordance with the present invention, an electronic control device is provided that includes a plurality of microcomputers. The electronic control device communicates with other devices through communication lines. The microcomputers share a communicator, which is provided between the microcomputers and the communication lines and adapted to transmit and receive signals. A power saving mode is performed to reduce power consumed by the electronic control device. The power saving mode is a mode during which any of the microcomputers that have made a sleep request are switched to a sleeping mode, and the communicator is switched to the sleeping mode after all the microcomputers have shifted to the sleeping mode.

To achieve the foregoing objective and in accordance with the present invention, a method of controlling a plurality of microcomputers included in an electronic control device adapted to conduct communication with other devices is provided. The method includes: causing the microcomputers to share a communicator provided between communication lines and adapted to transmit and receive a signal; and switching the electronic control device to a power saving mode during which power consumed by the electronic control device is reduced. The step of switching the electronic control device to the power saving mode includes: a first step during which microcomputers for which sleep requests are made are switched to sleeping mode; and a second during which the communicator is switched to the sleeping mode after all the microcomputers have shifted to the sleeping mode.

Typically in an electronic control device including a single microcomputer and a single communicator, when the microcomputer shifts to the sleeping mode, the communicator also shifts to the sleeping mode in accordance therewith. Therefore, when the electronic control device includes a plurality of thus-controlled microcomputers and one of such microcomputers shifts to the sleeping mode, the communicator also shifts to the sleeping mode in accordance therewith, a result of which is that the other microcomputers sharing the same communicator are not able to continue the communication.

According to the above configuration or method, the communicator does not shift to the sleeping mode when only one of the microcomputers included in the electronic control device has shifted to the sleeping mode. Therefore, the other microcomputers remaining in the normal operation mode without shifting to the sleeping mode are able to continue the communication via the communicator with the other electronic control devices connected to the same communicator. When all the microcomputers included in the electronic control device have shifted to the sleeping mode, the communicator also shifts to the sleeping mode in accordance therewith. Accordingly, until all the microcomputers included in the electronic control device have shifted to the sleeping mode, the signal transmission and reception via the communicator is continued. Further according to the above configuration or method, in order to switch the microcomputers and the communicator to the sleeping mode, there is no need to provide a control circuit between the communicator and the microcomputers for controlling the operation conditions of the microcomputers and the signals transmitted from the microcomputers. Therefore, the electronic control device having the microcomputers is simply configured. With this arrangement, the power consumed by the microcomputers is reduced with a more simplified configuration while securing the smooth transfer of the signal by the microcomputers.

In accordance with one aspect of the present invention, each of the microcomputers includes a standby terminal whose condition is selectively set to "H" logic level, "L" logic level or high impedance in relation to the communicator. The communicator shifts to the sleeping mode when any one of the standby terminals of the microcomputers is set to the "L" logic level. The microcomputers shifting to the sleeping mode switch outputs of the standby terminals to the high impedance at the time of shifting to the power saving mode.

Typically, when the standby terminal included in the microcomputer is switched to the "L" logic level, the communicator shifts to the sleeping mode in accordance therewith. In addition, since the "L" logic level is superior to the "H" logic level, the "L" logic level will be prioritized if some standby terminals of the microcomputers are set to "L" while others are set to "H" in a mixed manner. If so prioritized, the communicator may shift to the sleeping mode. More specifically, even when some microcomputers exhibit the "H" logic level and are continuously in communication, the communicator, which relays the signal of the microcomputers, may shift to the sleeping mode.

According to the above configuration, the standby terminals (STBN) of the microcomputers to be switched to the sleeping mode are set to high impedance, and thus the communicator does not shift to the sleeping mode in accordance with the high impedance. In other words, without affecting the operation conditions of the communicator, some of the microcomputers are switched to the sleeping mode.

In accordance with one aspect of the present invention, at the time of shifting to the power saving mode, after the standby terminals of the microcomputers are sequentially switched to the high impedance, the standby terminal of the microcomputer that lastly shifts to the sleeping mode is switched to the "L" logic level.

In accordance with one aspect of the present invention, each of the microcomputers is provided with a standby terminal whose condition is selectively set to "H" logic level, "L" logic level or high impedance in relation to the communicator. The communicator shifts to the sleeping mode when any one of the standby terminals of the microcomputers is set to the "L" logic level. The first step includes: sequentially switching the standby terminals of the microcomputers to the high impedance; and switching the standby terminal of the microcomputer that lastly shifts to the sleeping mode to the "L" logic level.

According to the above configuration or method, the standby terminals of the microcomputers shifting to the sleeping mode are sequentially switched to the high impedance, and only the standby terminal of the microcomputer that lastly shifts to the sleeping mode is switched to the "L" logic level. Thus, when the standby terminal of the microcomputer that lastly shifts to the sleeping mode has been switched to the "L" logic level, the communicator shifts to the sleeping mode. Accordingly, until the standby terminal of the microcomputer that lastly shifts to the sleeping mode is switched to the "L" logic mode, the operation conditions of the communicator are reliably maintained, and the communication via the communicator is also reliably maintained. Therefore, with use of the logic level settable to the standby terminals of the microcomputers and the conditions of the standby terminals, the operation conditions of the communicator are reliably controlled.

In accordance with one aspect of the present invention, at the time of shifting to the power saving mode, if the microcomputers shift to the sleeping mode simultaneously, the standby terminals of the microcomputers are switched to the "L" logic level simultaneously as a special exception.

In accordance with one aspect of the present invention, each of the microcomputers is provided with a standby terminal whose condition is selectively set to "H" logic level, "L" logic level or high impedance in relation to the communicator. The communicator shifts to the sleeping mode when any one of the standby terminals of the microcomputers is set to the "L" logic level. The first step includes switching the standby terminals of the microcomputers to the "L" logic level simultaneously as a special step for switching the microcomputers to the sleeping mode simultaneously.

According to the above configuration or method, if the microcomputers included in the electronic control device are switched to the sleeping mode simultaneously, the standby terminals of the microcomputers are collectively switched to the "L" logic level. Therefore, even if the microcomputers shift to the sleeping mode simultaneously, the communicator shifts to the sleeping mode in accordance with the sleeping mode of the microcomputers.

In accordance with one aspect of the present invention, the microcomputers are connected with one another by a dedicated communication line and adapted to transmit through the dedicated communication line information indicative of shifting to the sleeping mode. Each of the microcomputers monitors operation conditions of the other microcomputers sharing the communicator based on the information transmitted through the dedicated communication line. Based on the monitored operation conditions, each of the microcomputers determines whether the same microcomputer is required to set the standby terminal of the same microcomputer to the high impedance or to the "L" logic level at the time of shifting to the sleeping mode.

In accordance with one aspect of the present invention, the microcomputers are connected with one another by a dedicated communication line and adapted to transmit through the dedicated communication line information indicative of shifting to the sleeping mode. Each of the microcomputers monitors operation conditions of the other microcomputers based on the information transmitted through the dedicated communication line. Based on the monitored operation conditions, each of the microcomputers determines whether the same microcomputer is required to set the standby terminal of the same microcomputer to the high impedance or to the "L" logic level at the time of shifting to the sleeping mode.

According to the above configuration or method, the microcomputers are each capable of monitoring the other microcomputers sharing the same communicator, based on the signal transmitted through the dedicated communication lines connecting the microcomputers. Therefore, the microcomputers are each capable of constantly monitoring whether or not the other microcomputers sharing the same communicator have shifted to the sleeping mode, and thus capable of determining whether its own standby terminal should be set to the high impedance or the "L" logic level when the same microcomputer shifts to the sleeping mode, based on the monitoring results. Accordingly, the conditions of the standby terminals of the microcomputer are accurately determined, and the operation conditions of the communicator that shifts to the sleeping mode in accordance with the conditions of the standby terminals are controlled at higher accuracy.

In accordance with one aspect of the present invention, when a signal is input from control targets that the microcomputers control, the sleeping mode of the relevant microcomputers is cancelled. When the communicator receives a signal transmitted from an electronic control device different from the electronic control devices remaining in the sleeping mode, the power saving mode of the electronic control devices remaining in the sleeping mode is cancelled.

In accordance with one aspect of the present invention, the method of controlling microcomputers further includes: cancelling the sleeping mode of the microcomputers when a signal is input from control targets that the microcomputers control; and cancelling the power saving mode of the electronic control devices remaining in the sleeping mode when the communicator receives a signal transmitted from an electronic control device different from the electronic control devices remaining in the sleeping mode.

According to the above configuration or method, when a signal is output from the control targets that the microcomputers control, the sleeping mode of the microcomputers is cancelled, and the microcomputers perform the various controls in accordance with the signals input from the control targets. Further according to the above configuration or method, when the communicator receives a signal from any one of the other electronic control devices connected to the communication line, the power saving mode of the electronic control device is cancelled. Then, the microcomputers included in the electronic control device perform the controls in accordance with the signal received by the communicator. Therefore, the sleeping mode of the microcomputers is maintained until the various controls by the microcomputers included in the electronic control device become necessary. On the other hand, when such various controls become necessary, the sleeping mode of the microcomputers is cancelled, and thereafter the microcomputers perform the controls as required. Accordingly, while securing the time period during which the electronic control device performs the power saving mode and reducing the power consumption, the functions required for the electronic control devices are maintained.

In accordance with one aspect of the present invention, at the time of cancelling the power saving mode, based on input of a signal from a control target that any one of the microcomputers controls, the sleeping mode of the microcomputers that have input the signal is cancelled, and thereafter the sleeping mode of the communicator and the sleeping mode of the microcomputers that have not input the signal from the control target are cancelled.

In accordance with one aspect of the present invention, the step of cancelling the sleeping mode of the microcomputers sequentially: cancels the sleeping mode of a microcomputer that has input a signal from a control target that any one of the microcomputers controls, based on the input of the signal; and cancels the sleeping mode of the microcomputers that have not input the signal from the control target.

According to the above configuration or method, when a signal is transmitted from the control targets of a microcomputer due to occurrence of an event and the transmitted signal is input in the microcomputer, the sleeping mode of the microcomputer is cancelled. Subsequently, the sleeping mode of the communicator and the sleeping mode of the other microcomputers that have not input the signal from the control target are cancelled. Therefore, once the signal is input in the microcomputer from the control target, the sleeping mode of the same microcomputer, the communicator and the other microcomputers is suitably cancelled, and various controls based on the signal input from the control target are performed. Accordingly, the sleeping mode of the microcomputers is cancelled at a right timing, and various controls are smoothly performed by the microcomputers switched off from the sleeping mode.

In accordance with one aspect of the present invention, at the time of cancelling the power saving mode, after the sleeping mode of the communicator is cancelled based on input of a signal from the different electronic control device, the sleeping mode of all the microcomputers is cancelled.

In accordance with one aspect of the present invention, the step of cancelling the power saving mode sequentially: cancels the sleeping mode of the communicator based on input of a signal from the different electronic control device; and cancels the sleeping mode of all the microcomputers.

According to the above configuration or method, when a signal transmitted from a different electronic control device is input in the communicator of the electronic control device due to occurrence of an event, the sleeping mode of the communicator that has input the signal is cancelled. Subsequently, the sleeping mode of the microcomputers sharing the communicator is cancelled. Therefore, when the signal is input in the electronic control device from a different electronic control device, the sleeping modes of the communicator and microcomputers included in the electronic control device are suitably cancelled, and various controls based on the signal input from the control target are performed by the same electronic control device. Accordingly, the sleeping mode of the microcomputers is cancelled at a right timing, and the microcomputers having switched off from the sleeping mode more smoothly perform various controls.

DETAILED DESCRIPTION OF THE PREFERRED EMBODIMENTS

In the description below, an electronic control device and a method of controlling microcomputers according to one embodiment of the invention will be described with reference to FIGS. 1 to 11. The electronic control device and the method of controlling the microcomputers according to the present embodiment are applicable to an electronic control device connected to a vehicle network installed in a vehicle.

Figure 1:
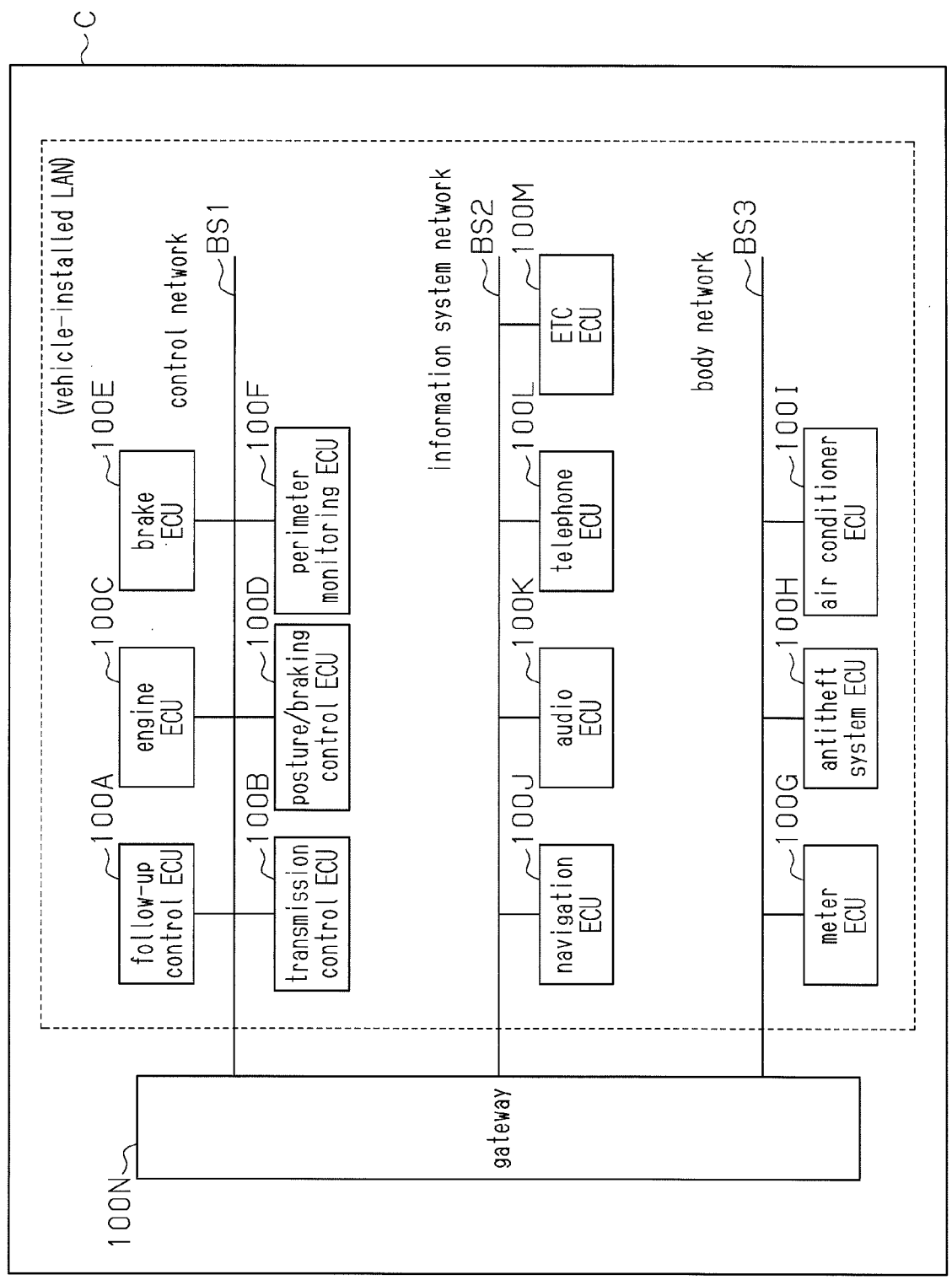
FIG. 1 is a block diagram depicting an electronic control device and a method of controlling microcomputers according to one embodiment of the present invention, more specifically depicting an example of a vehicle network formed by an electronic control device having microcomputers.

As depicted in FIG. 1, a vehicle C includes a control network including: electronic control devices (ECU) 100A to 100F adapted to electronically control a variety of vehicle devices such as engine and brake; and a communication line BS1. The control network is standard equipment serving as the core system. The vehicle C further includes a body network including: electronic control devices 100G to 100I adapted to control body devices such as meters for displaying a variety of vehicle conditions and air conditioners; and a communication line BS2, and the body network also serves as the core system. The vehicle C still further includes an information network including: electronic control devices 100J to 100M adapted to control a variety of information devices (e.g., a car navigation system for navigating the vehicle from the current point to the destination); and a communication line BS3.

The electronic control devices 100A to 100F included in the control network are, for instance, operative both while the ignition of the vehicle is turned off and while the ignition of the vehicle is turned on. The electronic control devices 100G to 100I included in the body network are, for instance, not operative while the ignition of the vehicle is turned off, but operative while the ignition of the vehicle is turned on. Further, the electronic control devices 100J to 100M included in the information network are, for instance, not operative while the accessories of the vehicle are turned off, but operative while the accessories of the vehicle are turned on.

The above networks are electrically connected with one another via, for instance, a gateway 100N also usable for relaying data communication with wireless communication devices. With this arrangement, for instance, the car navigation system performs various display supports for the driver based on the information about the vehicle operations obtained from various electronic control devices such as an engine controller and brake controller.

Figure 2:
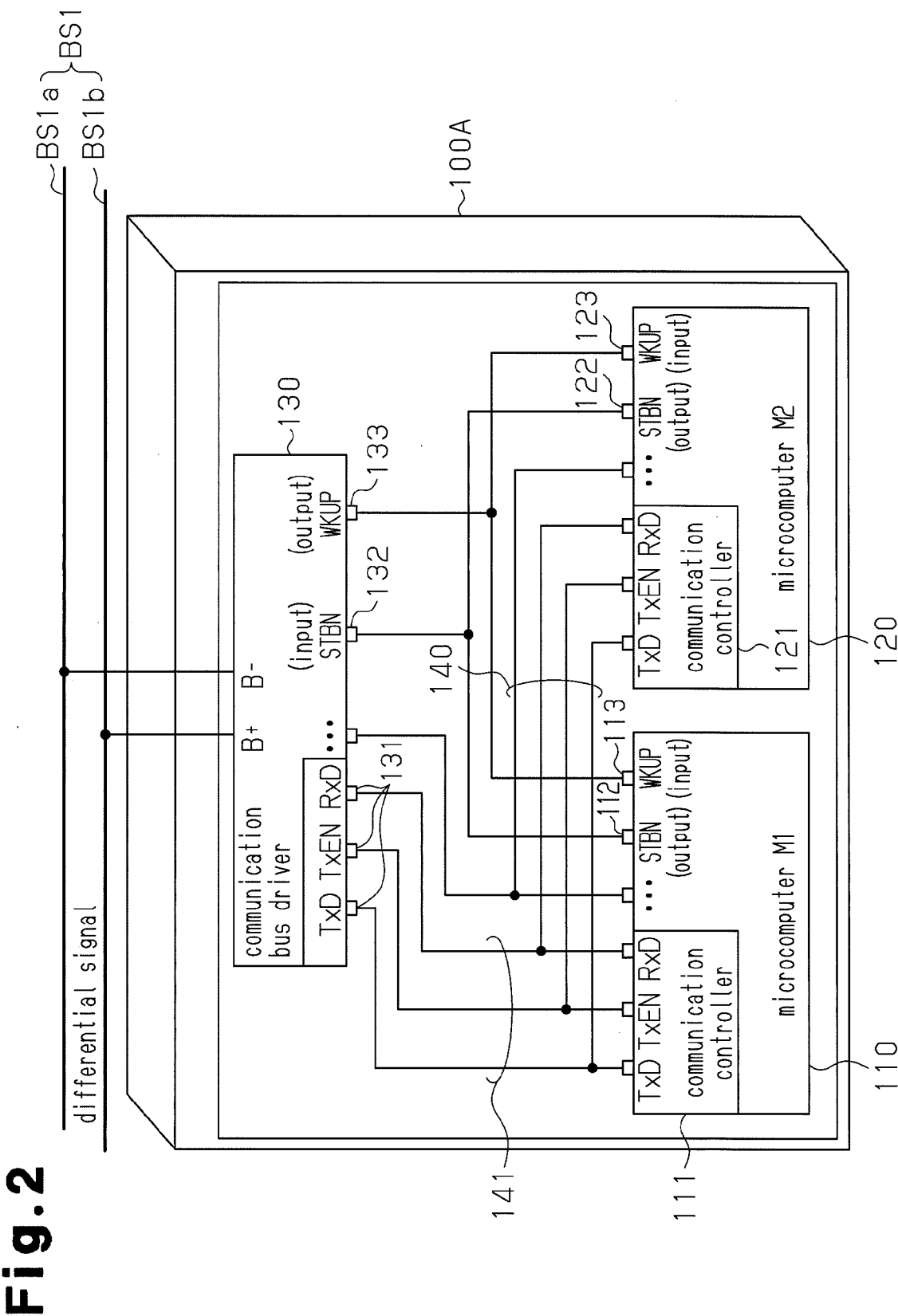
FIG. 2 is a block diagram schematically depicting a configuration of the electronic control device having the microcomputers.

Further, for instance, the communication line BS1 (BS2, BS3) to which the electronic control device 100A (whose configuration is schematically depicted in FIG. 2) is connected is a multiplex communication line for use in multiplex communication by time division. The communication line BS1 includes a pair of communication lines BS1*a* and BS1*b* made of CANH and CANL, both ends of which are mutually connected by a terminator. The communication line BS1 serves as a CAN (control area network) that transmits data with use of the two lines of BS1*a* and BS1*b*, and performs a bus communication based on the differential voltage between the communication lines BS1*a* and BS2*b* in accordance with a predetermined communication protocol.

The electronic control device 100A exemplarily includes a first microcomputer 110 and a second microcomputer 120 adapted to perform computing processing. The first microcomputer 110 and the second microcomputer 120 respectively perform different controls in accordance with the functions assigned thereto. Further, the electronic control device 100A includes: a communication bus driver 130 (serving as a communicator) connected to the communication lines BS1*a* and BS1*b* and adapted to transmit and receive data via the communication lines BS1*a* and BS1*b*; and internal memories ROM, RAM and the like (not depicted) for storing a variety of programs and data. In the present embodiment, since the single electronic control device 100A includes the two microcomputers 110 and 120, the microcomputers 110 and 120 share the communication bus driver 130.

The microcomputers 110 and 120 control the communication bus driver 130 such that the differential voltage is generated between the communication lines BS1*a* and BS1*b* at the time of data transmission in accordance with the transmitted data, and also receive data demodulated by the communication bus driver 130.

The microcomputers 110 and 120 respectively include communication controllers 111 and 121 adapted to control the transmission and reception of signals by the microcomputers 110 and 120. The communication controllers 111 and 121 provided respectively to the microcomputers 110 and 120 are connected with each other via a communication line 140. In addition, the communication controllers 111 and 121 are connected to a communication controller 131 provided to the communication bus driver 130 via a communication line 141. With such arrangements, signals are transferred between the microcomputers 110 and 120 and the communication bus driver 130 via the communication lines 140 and 141.

The microcomputers 110 and 120 respectively include standby terminals (STBN) 112 and 122 adapted to selectively output "high (H)" and "low (L)" logic level signals. The standby terminals 112 and 122 according to the present embodiment include, for instance, a three-state buffer, so that not only the outputting of the "H" and "L" signals is enabled, but also the switching to high impedance is enabled. The standby terminals 112 and 122 are connected via the communication line 142 to an input standby terminal 132 provided to the communication bus driver 130.

The microcomputers 110 and 120 respectively further include wake-up terminals 113 and 123 into which signals for returning the microcomputers having shifted to the sleep mode to a wake-up mode (e.g., an "L" logic level signal) are input from a wake-up terminal 133 provided to the communication bus driver 130. The wake-up terminals 113 and 123 are connected via the communication line 143 to the wake-up terminal 133 provided to the communication bus driver 130.

The communication bus driver 130 is controlled based on the transmission command input from the microcomputers 110 and 120 such that a predetermined differential voltage is generated between the CANH and CANL of the communication lines BS1*a* and BS1*b*. The communication bus driver 130 further detects as a signal the differential voltage generated between the CANH and CANL of the communication lines BS1*a* and BS1*b*, and demodulates the received data. Then, the communication bus driver 130 transmits the data to the microcomputers 110 and 120.

The voltage applied to the CANH of the commutation line BS1 from the communication bus driver 130 is typically adjusted to conform to either the dominant side (e.g., 3.5 V) or the recessive side (e.g., 2.5 V). In addition, the voltage applied to the CANL of the communication line BS1 from the communication bus driver 130 is typically adjusted to conform to either the dominant side (e.g., 1.5 V) or the recessive side (e.g., 2.5 V).

The electronic control device 100A configured as described above shifts from the normal operation mode to the power saving mode (i.e., a mode during which the processing for reducing the power consumption is performed) when the occurrence of events (e.g., turning on of the ignition while the ignition of the vehicle C is cancelled, opening of the door, reception of radio signals, or reception of bus edges from the other electronic control devices 100B to 100M) has not been detected for a long time. The power saving mode according to the present embodiment refers to a mode during which all the microcomputers 110 and 120 included in the electronic control device 100A and the communication bus driver 130 have shifted to a sleeping mode.

When the occurrence of an event is detected during the power saving mode while the ignition is cancelled, the electronic control device 100A cancels the power saving mode to be activated. Then, after the activation, the electronic control device 100A shifts to the wake-up mode during which the communication via the communication lines BS1*a* and BS1*b* is enabled. Further, when inputting a signal in accordance with the occurrence of an event such as the reception of bus edges from the other electronic control devices 100B to 100M, the electronic control device 100A shifts to the wake-up mode from the power saving mode.

Figure 3:
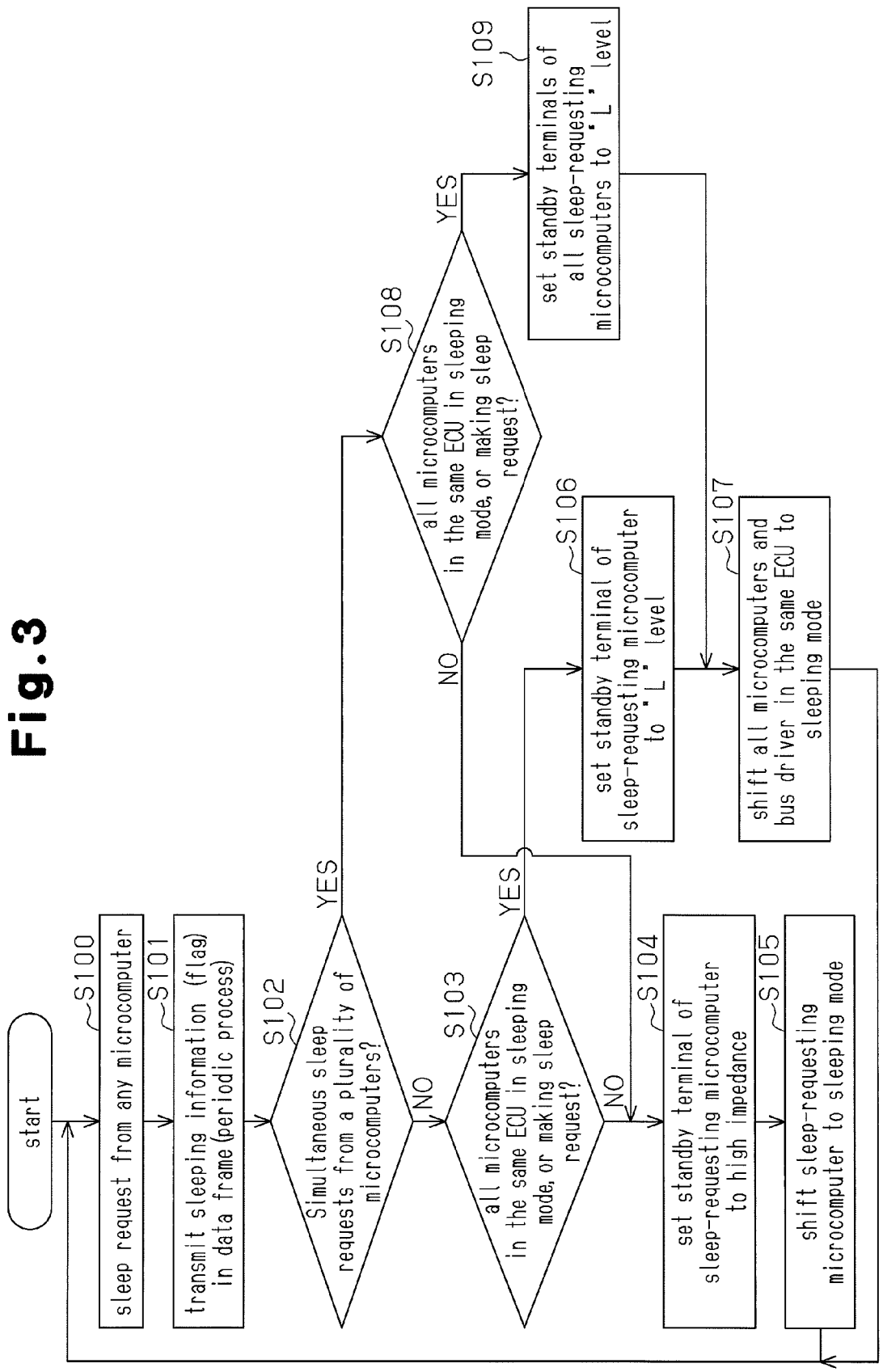
FIG. 3 is a flowchart depicting a switching procedure for switching to a power saving mode according to the embodiment.
Figure 4:
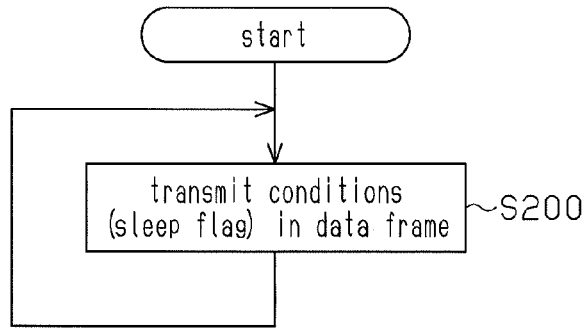
FIG. 4 is a flowchart depicting an example of a periodical transmission procedure of data frame transmitted by the microcomputers.
Figure 5:
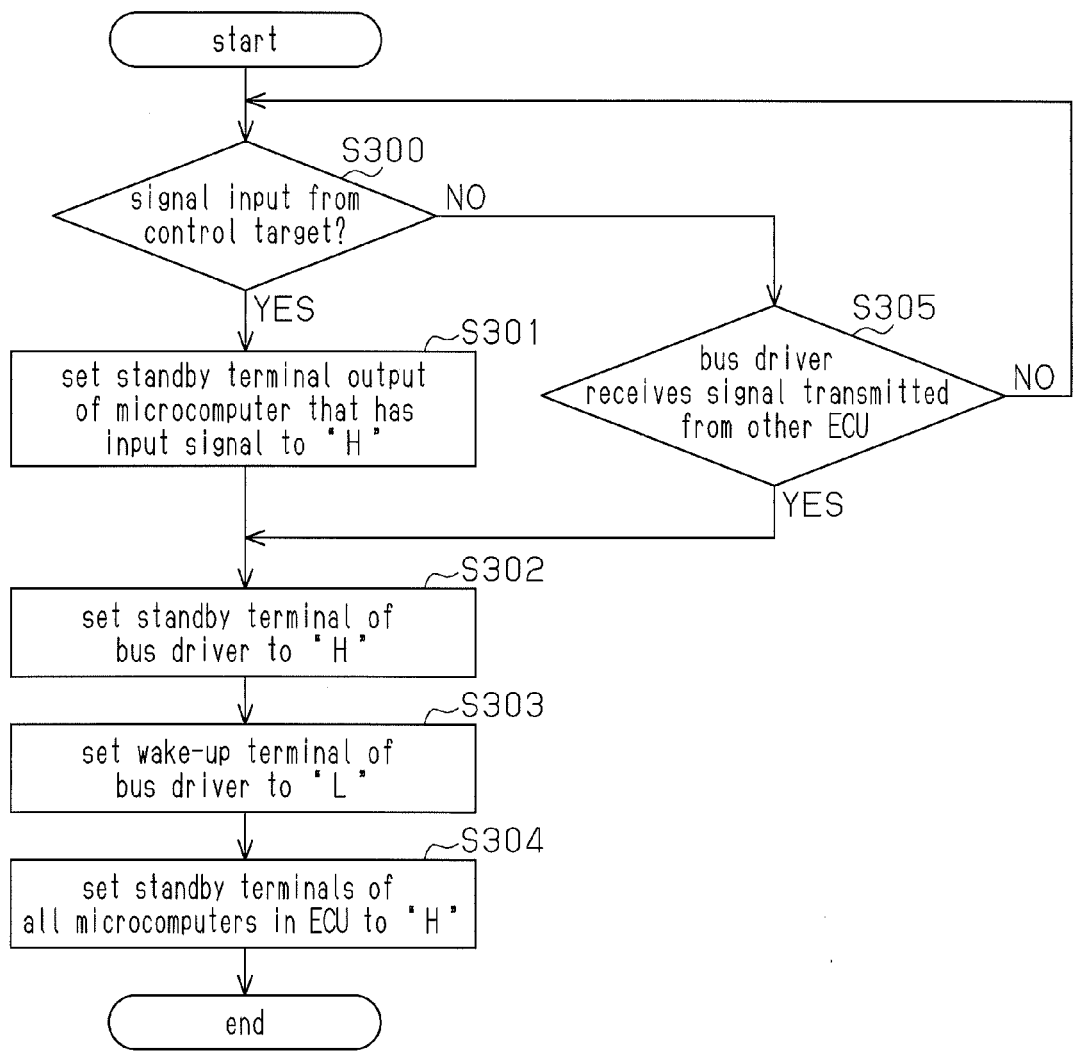
FIG. 5 is a flowchart depicting a turn-off procedure of the power saving mode according to the embodiment.

The next description will describe procedures for switching the operation mode of the microcomputers in the electronic control device and the method of controlling the microcomputers according to the present embodiment, with reference to the flowcharts depicted in FIGS. 3 to 5.

As depicted in FIG. 3 as step S100, when the control over the control target by the first microcomputer 110 (microcomputer M1) becomes unnecessary due to, for instance, a stop of the vehicle C, a declaration is made that the first microcomputer 110 will shift to the sleeping mode, in order to reduce the power consumed by the first microcomputer 110. At this time, the standby terminals 112 and 122 of the microcomputers 110 and 120, which are in the wake-up mode, are exemplarily set to be the "H" logic level. The first microcomputer 110 and the second microcomputer 120 (microcomputer M2) control, for instance, an engine injection nozzle and steering (i.e., control targets not depicted) without using the communication bus driver 130.

The first microcomputer 110 according to the present embodiment transmits through the communication lines 140 and 141 data frame that indicates that the first microcomputer 110 shifts to the sleeping mode. The data frame thus transmitted though the communication lines 140 and 141 are sent to the second microcomputer 120, and further sent to the other electronic control devices 100B to 100M via the communication bus driver 130 (step S101).

In the present embodiment, as depicted in FIG. 4 as step S200, data frame that indicates whether the microcomputers 110 and 120 are in the sleeping mode or the wake-up mode is periodically transmitted through the communication lines 140 and 141 as well as through the communication lines BS1 to BS3. With such arrangements, in the present embodiment, the second microcomputer 120 and the other electronic control devices 100B to 100M are capable of monitoring the conditions of the first microcomputer 110. Likewise, as data frame that indicates the conditions of each microcomputer is transmitted from the second microcomputer 120 and other microcomputers included in the electronic control devices 100B to 100M each, the first microcomputer 110 is also capable of monitoring the conditions of the other microcomputers.

As depicted in FIG. 3 as step S102, a determination is made on whether or not the microcomputers 110 and 120 included in the electronic control device 100A have made the sleep requests simultaneously. Subsequently, when the sleep requests are made at different timings, then a determination is made on whether or not all microcomputers included in the same electronic control device have already shifted to the sleeping mode or whether or not all such microcomputers are making the sleep requests (step S103). More specifically, a determination is made on whether or not the second microcomputer 120, which shares the communication bus driver 130 with the first microcomputer 110 having made the sleep request during the step S100, has already shifted to the sleeping mode, or on whether the second microcomputer 120 is making the sleep request.

When the second microcomputer 120 has neither shifted to the sleeping mode nor is making the sleep request (step S103: NO), the first microcomputer 110 changes the logic level of the standby terminal 112 of the microcomputer 110 from "H" to high impedance (step S104). When the standby terminal 112 of the microcomputer 110 is changed to high impedance as described above, the first microcomputer 110 shifts from the wake-up mode to the sleeping mode (step S105).

On the other hand, when the second microcomputer 120 has already shifted to the sleeping mode or is making the sleep request (step S103: YES), the first microcomputer 110 changes the logic level of the standby terminal 112 of the first microcomputer 110 from "H" to "L" (step S106). More specifically, the first microcomputer 110 determines itself as the microcomputer that lastly shifts to the sleep mode in the electronic control device 100A, and changes the logic level of itself to "L", thereby shifting to the sleeping mode from the wake-up mode. With the logic level of the standby terminal 112 of the first microcomputer 110 changed to "L", the communication bus driver 130, which has input the logic level "L", shifts to the sleep mode from the wake-up mode (step S107). In this manner, the electronic control device 100A shifts to the power saving mode from the normal operation mode. The standby terminal 112 whose logic level has been changed to "L" will be changed to high impedance after lapse of a predetermined time.

On the other hand, if the microcomputers 110 and 120 included in the electronic control device 100A make the sleep requests simultaneously (step S102: YES), the logic levels of the standby terminals 112 and 122 are changed from "H" to "L" (step S108: YES, S109). By this operation, all the microcomputers 110 and 120 included in the electronic control device 100A shift to the sleeping mode, and the communication bus driver 130 shifts from the wake-up mode to the sleeping mode. In this way, the electronic control device 100A shifts from the normal operation mode to the power saving mode. At this time as well, the standby terminal 112 whose logic level has been set to "L" is changed to high impedance after lapse of a predetermined time.

Next, as depicted in FIG. 5, when the power saving mode is to be cancelled, first of all, a determination will be made during a step S300 on whether or not a signal is input in either the microcomputer 110 or 120 from the control targets of the microcomputers 110 and 120. If a signal is input into the microcomputer 110 from, for instance, the control target that the microcomputer 110 controls, the standby terminal 112 of the microcomputer 110 is changed from high impedance to "H" logic level (step S301).

Subsequently, the signal of the "H" logic level is input into the standby terminal 132 of the communication bus driver 130 via the communication line 142 (step S302). In accordance therewith, the communication bus driver 130 shifts to the wake-up mode from the sleeping mode. Then, the communication bus driver 130 having shifted to the wake-up mode outputs the signal of "L" logic level from the wake-up terminal 133 of the communication bus driver 130 (step S303).

Subsequently, the signal of the "L" logic level output from the wake-up terminal 133 is input into the wake-up terminals 113 and 123 of the microcomputers 110 and 120. With this operation, the second microcomputer 120, which has shifted to the sleeping mode, shifts to the wake-up mode. Then, the second microcomputer 120 switches the standby terminal 122 of the second microcomputer 120 from the high impedance to the "H" logic level (step S304). By this way, the microcomputers 110 and 120 included in the electronic control device 100A and the communication bus driver 130 shift from the sleeping mode to the wake-up mode, thereby cancelling the power saving mode of the electronic control device 100A.

On the other hand, when no control signal is input from the control targets into the microcomputer 110 or 120 during the step S300 (step S300: NO), a determination is made on whether or not the communication bus driver 130 has received a signal from any one of the electronic control devices 100B to 100M (i.e., electronic control device other than the electronic control device having the communication bus driver 130) (step S305). In other words, whether or not the voltage of the communication line BS1 connected to the communication bus driver 130 has been changed is determined. Then, when the signal transmitted from any one of the electronic control devices 100B to 100M is input into the communication bus driver 130 of the electronic control device 100A (step S305: YES), the logic level of the standby terminal 132 of the communication bus driver 130 is changed to "H" (step S302). Subsequently, the wake-up terminal 133 of the communication bus driver 130 outputs the signal of the "L" logic level, and this signal is input into the wake-up terminals 113 and 123 of the microcomputers 110 and 120 (step S303). Then, the microcomputers 110 and 120, whose wake-up terminals 113 and 123 have input the signal of the "L" logic level, shift to the wake-up mode from the sleeping mode (step S304). In this way, the power saving mode of the electronic control device 100A is cancelled.

Figure 6:
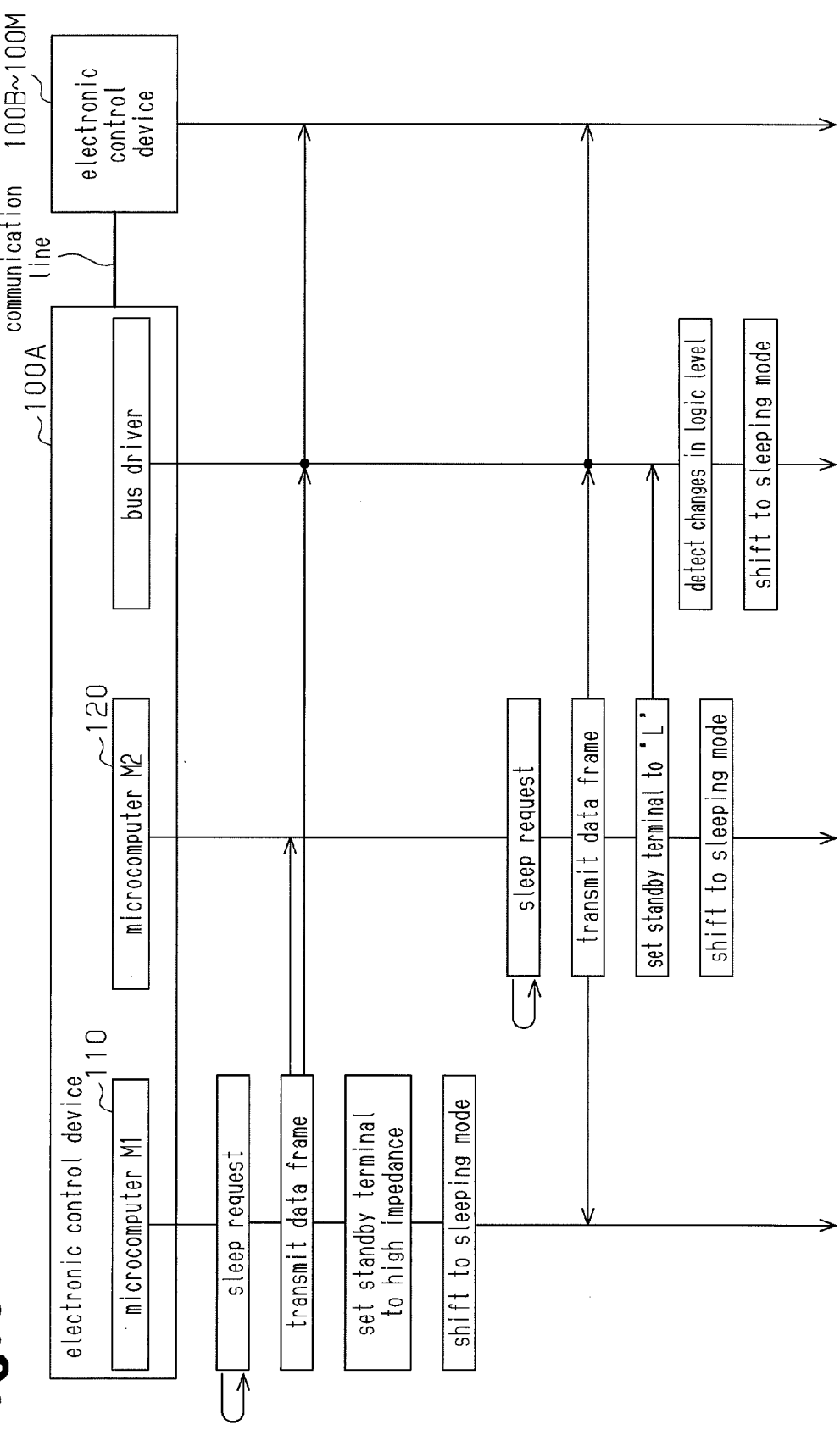
FIG. 6 is a sequence diagram depicting a switching operation of an operation mode when the microcomputers included in the electronic control device make sleep requests at different timings.
Figure 7:
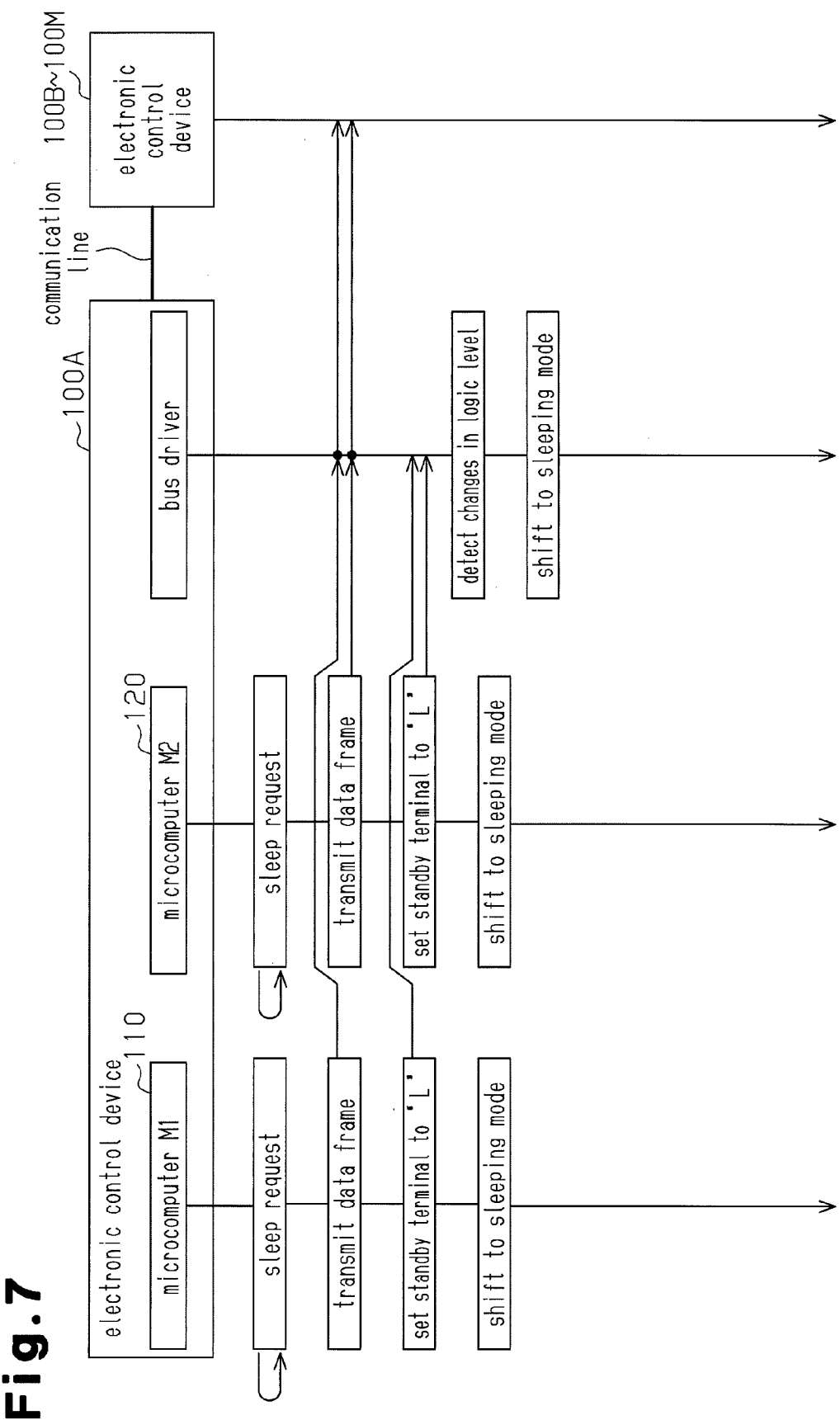
FIG. 7 is a sequence diagram depicting a switching operation of an operation mode when the microcomputers included in the electronic control device make sleep requests at the same timing.
Figure 8:
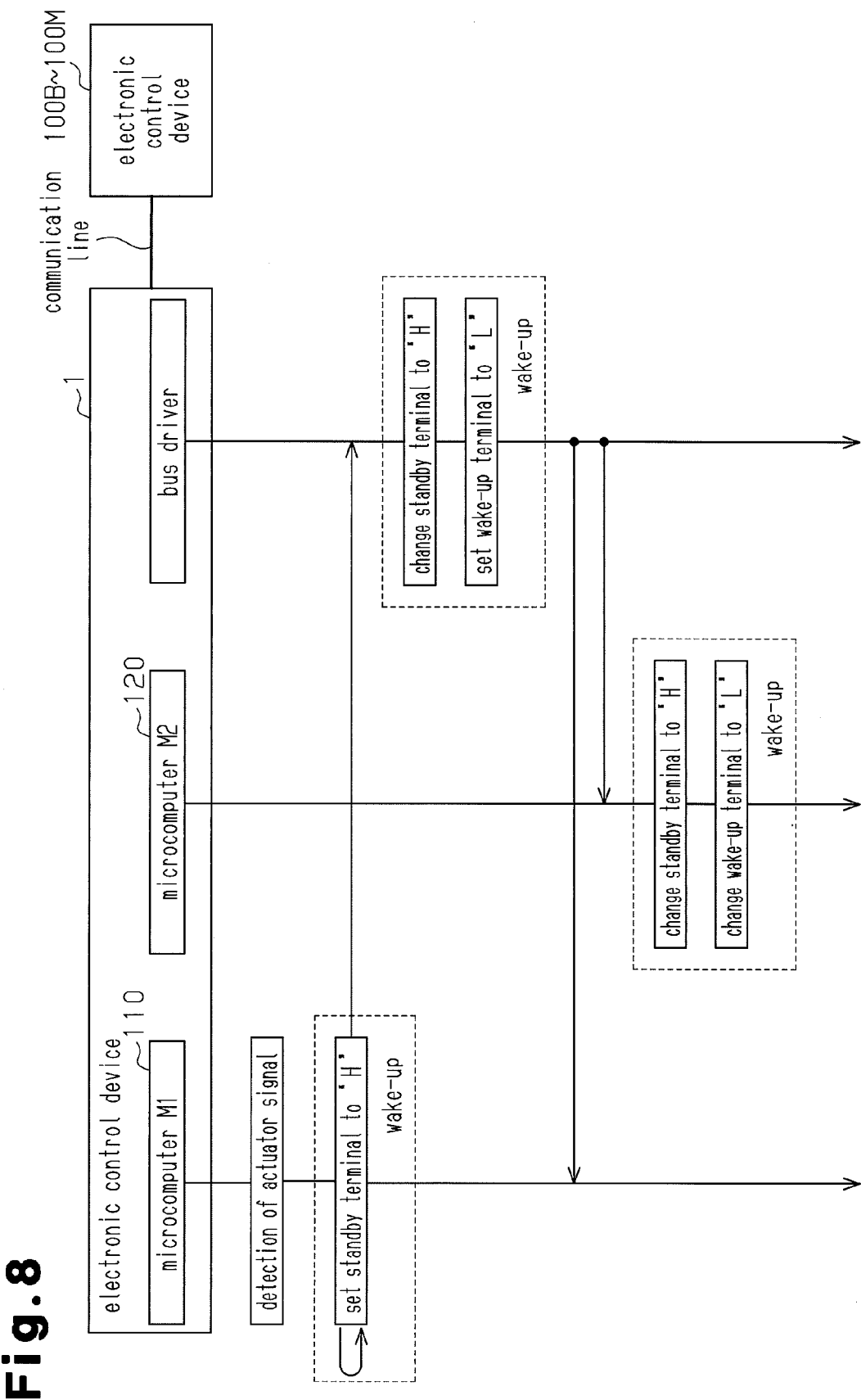
FIG. 8 is a sequence diagram depicting a return operation returning from the power saving mode to a normal operation mode when a control signal is input in a first microcomputer.
Figure 9:
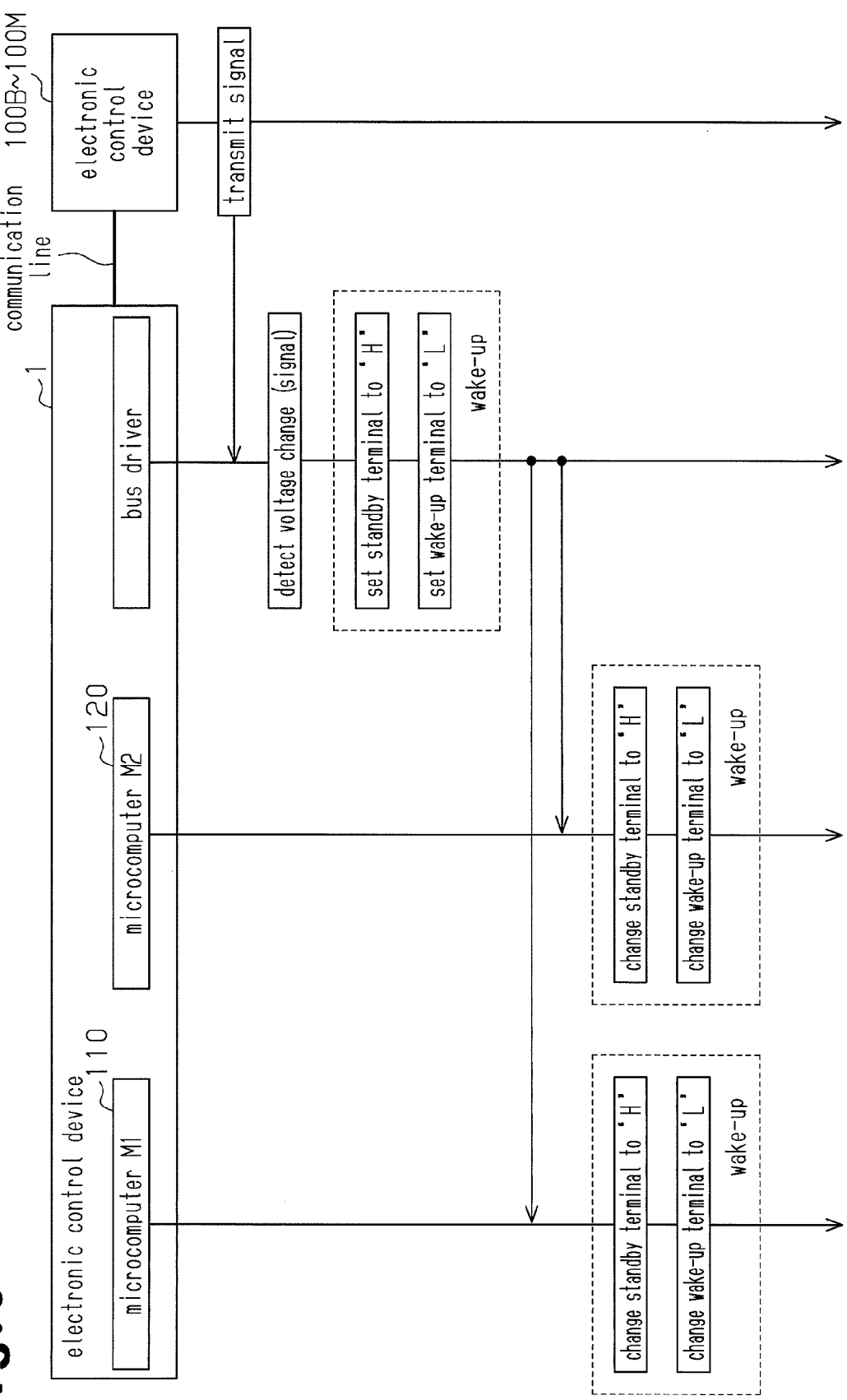
FIG. 9 is a sequence diagram depicting a return operation returning from the power saving mode to the normal operation mode when a communication bus driver of a first electronic control device receives a signal transmitted by a second electronic control device.

In the next description, the operation of the microcomputers in the electronic control device and the method of controlling the microcomputers according to the present embodiment will be described with reference to sequence diagrams depicted in FIGS. 6 to 9 and timing diagrams depicted in FIGS. 10 and 11. FIG. 6 depicts a switching operation of an operation mode when the microcomputers 110 and 120 included in the electronic control device 100A make sleep requests at different timings. FIG. 7 depicts a switching operation of an operation mode when the microcomputers 110 and 120 included in the electronic control device 100A make sleep requests at the same timing. FIG. 8 depicts a return operation returning from the power saving mode to the normal operation mode when a control signal is input in the first microcomputer 110. FIG. 9 depicts a return operation returning from the power saving mode to the normal operation mode when the communication bus driver 130 receives a signal transmitted by any one of the other electronic control devices 100B to 100M.

As depicted in FIG. 6, when, for instance, the first microcomputer 110 (microcomputer M1) makes a sleep request in accordance with changes in the condition of the vehicle C (FIG. 10: point in time t1), data frame indicative thereof is transmitted to the second microcomputer 120 (microcomputer M2), the communication bus driver 130 and the other electronic control devices 100B to 100M. Then, the standby terminal 112 of the first microcomputer 110 is changed to the high impedance (FIG. 10: point in time t2), and the first microcomputer 110 shifts to the sleeping mode from the wake-up mode (FIG. 10: point in time t3).

Subsequently, when the second microcomputer 120 makes the sleep request (FIG. 10: point in time t4), data frame indicative thereof is transmitted to the first microcomputer 110, the communication bus driver 130 and the other electronic control devices 100B to 100M. Then, based on the data frame transmitted from the first microcomputer 110, the second microcomputer 120 recognizes that the first microcomputer 110 has shifted to the sleeping mode, and that the second microcomputer 120 is the microcomputer that lastly shifts to the sleeping mode in the electronic control device 100A. The second microcomputer 120 changes the logic level of the standby terminal 122 of the second microcomputer 120 from "H" to "L" (FIG. 10: point in time t5), and the second microcomputer 120 shifts to the sleeping mode from the wake-up mode (FIG. 10: point in time t6).

Figure 10:
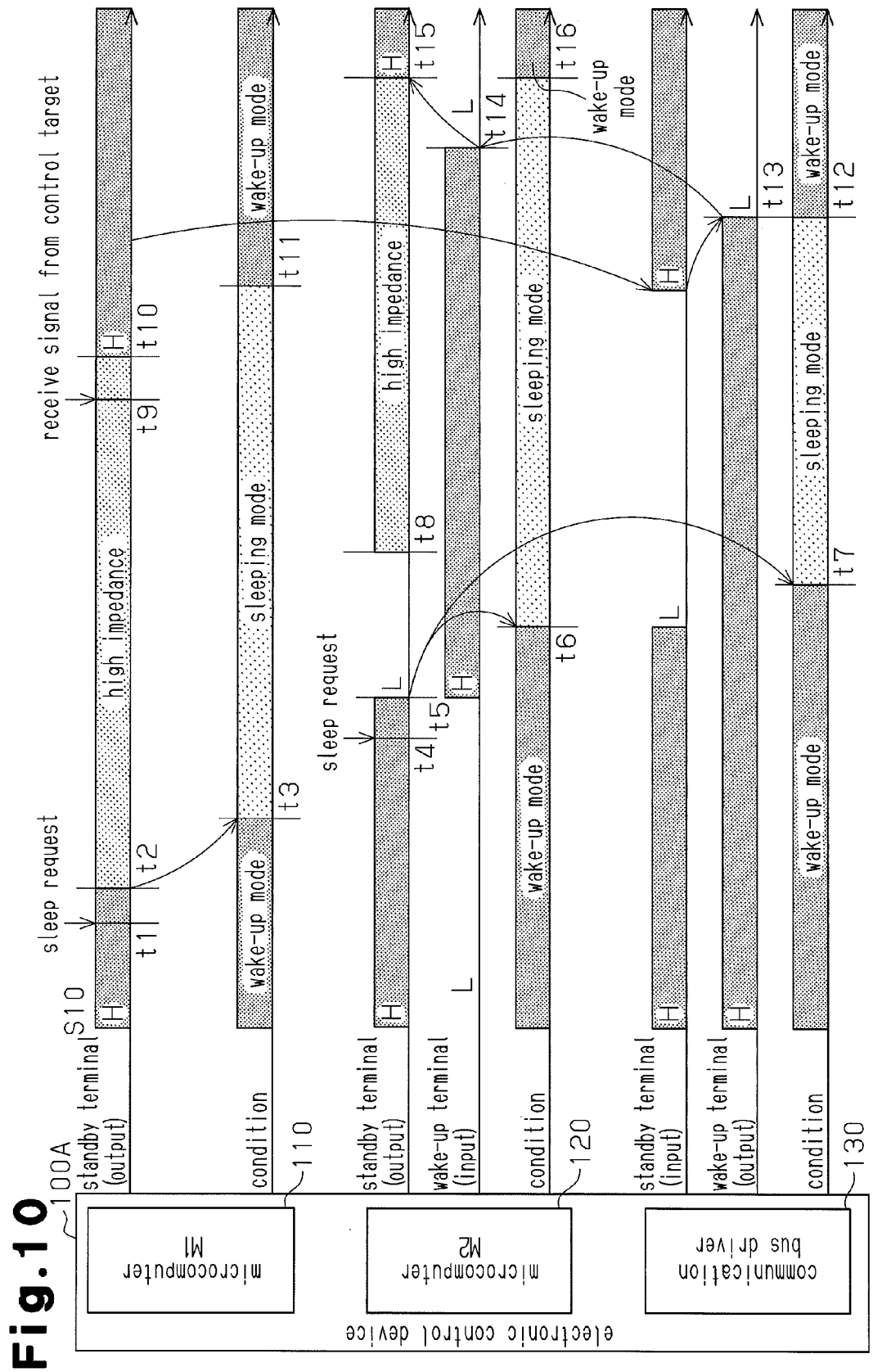
FIG. 10 is a timing diagram depicting: a shifting operation for shifting to the power saving mode when the microcomputers of the electronic control device make the sleep requests at different timings; and a turn-off operation of the power saving mode when a control signal is input in the first microcomputer.

Subsequently, when the communication bus driver 130 detects that the logic level of the standby terminal 122 of the second microcomputer 120 is changed to "L", the communication bus driver 130 shifts to the sleeping mode from the wake-up mode (FIG. 10: point in time t7). By this operation, the operation mode of the electronic control device 100A shifts from the normal mode to the power saving mode. Just for reference, for instance, the logic level of the standby terminal 122 that has been changed to "L" is to be changed to the high impedance after the communication bus driver 130 shifts to the sleeping mode (FIG. 10: point in time t8). In this configuration, when the communication bus driver 130 having shifted to the sleeping mode shifts to the wake-up mode, the standby terminals 112 and 122 are both set to the high impedance. More specifically, this configuration suppresses the communication bus driver 130 from, irrespective of no sleep request from the microcomputers 110 and 120, returning to the sleeping mode when the communication bus driver 130 shifts to the wake-up mode, in accordance with, for instance, the "L" logic level set to the standby terminals 112 and 122.

Further, according to an example depicted in FIG. 7, when based on the changes in the conditions of the vehicle C, the microcomputers 110 and 120 make the sleep requests simultaneously (FIG. 11: point in time ta), data frame indicative thereof is transmitted to the communication lines 140, 141, BS1 and the like. In other words, the data frame indicating that the sleep request has been made is transmitted to the microcomputers 110 and 120, the communication bus driver 130, and the other electronic control devices 100B to 100M. By this operation, the microcomputers 110 and 120 each recognize that a microcomputer other than itself is making a sleep request at the same timing. Then, the microcomputers 110 and 120 respectively change the logic level of the standby terminals 112 and 122 from "H" to "L" (FIG. 11: point in time tb), and the microcomputers 110 and 120 shift from the wake-up mode to the sleeping mode (FIG. 11: point in time tc). The communication bus driver 130, which has detected that the logic level of the standby terminals 112 and 122 of the microcomputers 110 and 120 has been changed to "L", shifts to the sleeping mode from the wake-up mode in accordance therewith (FIG. 11: point in time td). In this manner, the operation mode of the electronic control device 100A shifts to the power saving mode from the normal mode. Just for a reference, the logic level of the standby terminals 112 and 122 having been changed to "L" is to be changed to high impedance after the communication bus driver 130 shifts to the sleeping mode (FIG. 11: point in time te).

As depicted in FIG. 8, when the first microcomputer 110 having once shifted to the sleeping mode inputs a signal transmitted from the control target (FIG. 10: point in time t9), the first microcomputer 110 switches the standby terminal 112 from the high impedance to "H" (FIG. 10: point in time t10). Then, the first microcomputer 110 having been in the sleeping mode shifts to the wake-up mode (FIG. 10: point in time t11).

When detecting that the logic level of the standby terminal 112 of the first microcomputer 110 has been changed to "H", the communication bus driver 130 shifts from the sleeping mode to the wake-up mode (FIG. 10: point in time t12). In addition, the communication bus driver 130 changes the logic level of the wake-up terminal 133 of the communication bus driver 130 from "H" to "L" (FIG. 10: point in time t13).

Then, when the logic level of the wake-up terminal 133 of the communication bus driver 130 is changed to "L", a signal indicating this logic level is input in the wake-up terminal 123 of the second microcomputer 120 having been in the sleeping mode (FIG. 10: point in time t14). As the result, the standby terminal 122 of the second microcomputer 120 is changed from the high impedance to the "H" logic level (FIG. 10: point in time t15), and the microcomputer 120 shifts to the wake-up mode (FIG. 10: point in time t16).

Figure 11:
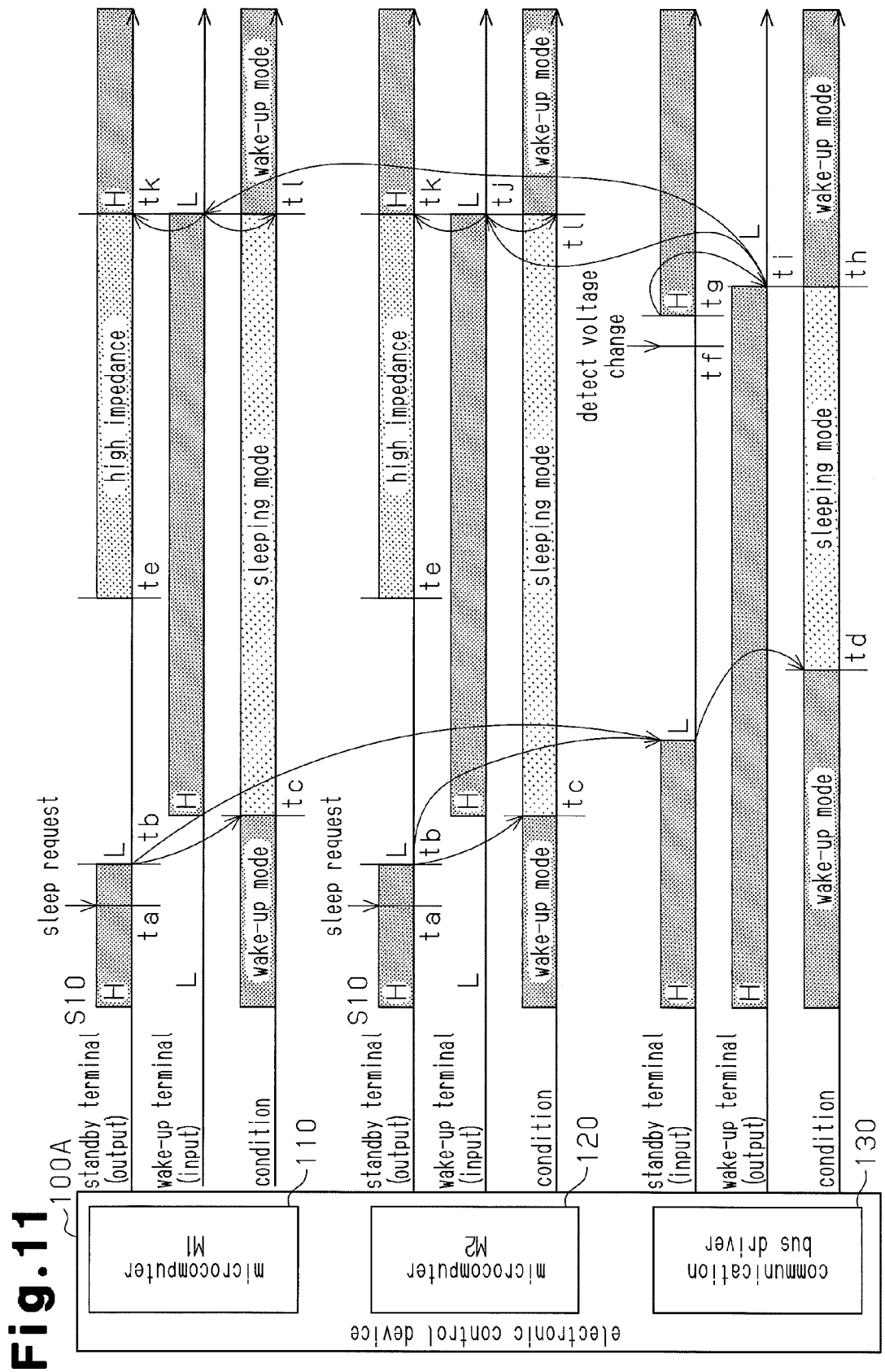
FIG. 11 is a timing diagram depicting: a shifting operation for shifting to the power saving mode when the microcomputers included in the electronic control device make the sleep requests at the same timing; and a turn-off operation of the power saving mode when the communication bus driver of the first electronic control device receives a signal transmitted by the second electronic control device.
Figure 12:
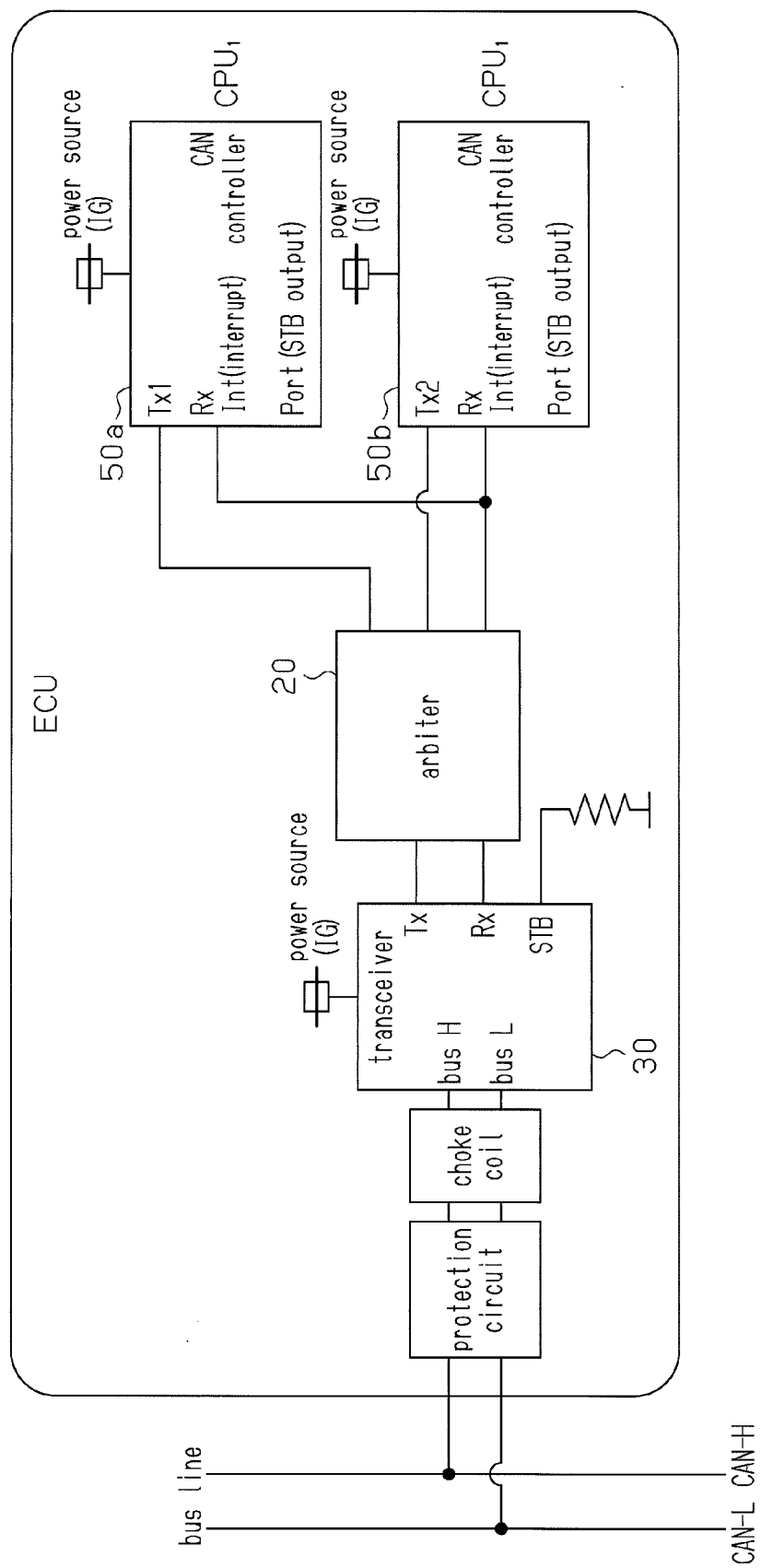
FIG. 12 is a block diagram schematically depicting a configuration of a known electronic control device.

On the other hand, assume that as depicted in FIG. 9, the bus level of the communication line BS1, to which the communication bus driver 130 is connected, has changed in accordance with the transmission of the signal from any one of the other electronic control devices 100B to 100M (FIG. 11: point in time tf). Then, the logic level of the standby terminal 132 of the communication bus driver 130 is changed from "L" to "H" in accordance therewith (FIG. 11: point in time tg), and the communication bus driver 130 having been in the sleeping mode shifts to the wake-up mode (FIG. 11: point in time th).

Subsequently, the logic level of the wake-up terminal 133 of the communication bus driver 130 having shifted to the wake-up mode is changed from "H" to "L" (FIG. 11: point in time ti), and the signal indicating this logic level is input in the wake-up terminals 113 and 123 of the microcomputers 110 and 120 (FIG. 11: point in time tj). Then, in accordance therewith, the standby terminals 112 and 122 of the microcomputers 110 and 120 are changed from the high impedance to the "H" logic level in accordance therewith (FIG. 11: point in time tk), and the microcomputers 110 and 120 having been in the sleeping mode shift to the wake-up mode (FIG. 11: point in time tl).

According to the electronic control device and the method of controlling the microcomputers in the present embodiment as described above, the following advantages are obtained.

(1) In the power saving mode provided to the electronic control device, during which the power consumed by the electronic control devices 100A to 100M is reduced, the microcomputers 110 and 120 having made the sleep requests are switched to the sleeping mode, and the communication bus driver 130 is also switched to the sleeping mode after all of the microcomputers included in the electronic control device 100A have shifted to the sleeping mode. Accordingly, until all of the microcomputers included in the electronic control device 100A have shifted to the sleeping mode, the microcomputers 110 and 120 having been in the wake-up mode are capable of continuously transmitting and receiving the signal through the communication bus driver 130. Further in the above embodiment, in order to switch the microcomputers 110 and 120 and the communication bus driver 130 to the sleeping mode, there is no need to provide between the communication bus driver 130 and the microcomputers 110 and 120 a control circuit adapted to control the operation conditions of the microcomputers 110 and 120 and the signals transmitted from the microcomputers 110 and 120. Therefore, configurations of the electronic control device 100A having the microcomputers 110 and 120 and the electronic control devices 100B to 100M are further simplified. In this manner, with a simplified configuration, the power consumed by the microcomputers 110 and 120 is reduced while smoothly transferring the signals.

(2) The microcomputers 110 and 120 are provided respectively with the standby terminals 112 and 122 whose conditions are selectively set to "H" logic level, "L" logic level or high impedance in relation to the communication bus driver 130. Further, when either one of the standby terminals 112 and 122 of the microcomputers 110 and 120 is set to the "L" logic level, the communication bus driver 130 is switched to the sleeping mode. Then, at the time of shifting to the power saving mode, the standby terminals 112 and 122 of the microcomputers 110 and 120 shifting to the sleeping mode are set to the high impedance. This configuration suppresses the communication bus driver 130 from shifting to the sleeping mode in accordance with the setting of the standby terminals 112 and 122 to the high impedance. Accordingly, without affecting the operation conditions of the communication bus driver 130 at all, either one of the microcomputers 110 and 120 is switched to the sleeping mode.

(3) At the time of shifting to the power saving mode, the standby terminal 112 of the first microcomputer 110, which is the microcomputer that has made the first sleep request, is changed to the high impedance, and thereafter the standby terminal 122 of the second microcomputer 120, which is the microcomputer that lastly shifts to the sleeping mode, is changed to the "L" logic level. Therefore, the operation conditions of the communication bus driver 130 are reliably maintained until the standby terminal of the second microcomputer 120 (i.e., the microcomputer that lastly shifts to the sleeping mode) is changed to the "L" logic level, and the communication by way of the communication bus driver 130 is reliably maintained. Accordingly, by utilizing the logic levels and conditions settable to the standby terminals 112 and 122 of the microcomputers 110 and 120, the operation conditions of the communication bus driver 130 are reliably controllable.

(4) At the time of shifting to the power saving mode, if the microcomputers 110 and 120 shift to the sleeping mode simultaneously, the standby terminals 112 and 122 of the microcomputers 110 and 120 are changed to the "L" logic level simultaneously as the special exception. Therefore, if the microcomputers 110 and 120 shift to the sleeping mode simultaneously, the standby terminals 112 and 122 of the microcomputers 110 and 120 are collectively changed to the "L" logic level. Accordingly, even if the microcomputers 110 and 120 shift to the sleeping mode simultaneously, the communication bus driver 130 shifts to the sleeping mode in accordance with the shifting of the microcomputers 110 and 120 to the sleeping mode.

(5) The microcomputers 110 and 120 are connected with each other by the dedicated communication line 140, and the microcomputers 110 and 120 are each configured to monitor the other one of microcomputers 110 and 120 sharing the same communication bus driver 130 based on the information received via the dedicated communication line 140. In addition, the microcomputers 110 and 120 determine whether their standby terminals 112 and 122 are set to the high impedance or to the "L" logic level at the time of shifting to the sleeping mode, based on the operation conditions monitored. Therefore, the microcomputers 110 and 120 are capable of constantly monitoring whether or not the other microcomputers 120 and 110 sharing the same communication bus driver 130 have shifted to the sleeping mode, and also capable of determining based on the monitoring results whether their standby terminals 112 and 122 are set to the high impedance or to the "L" logic level when the microcomputers 110 and 120 shift to the sleeping mode. Accordingly, the conditions of the standby terminals 112 and 122 of the microcomputers 110 and 120 are accurately determined, and the operation conditions of the communication bus driver 130, which is adapted to shift to the sleeping mode in accordance with the conditions of the standby terminals, are more accurately controllable.

(6) When the signal is input in the first microcomputer 110 from the control target of the first microcomputer 110, the sleeping mode of the first microcomputer 110 is cancelled. In addition, when the communication bus driver 130 receives a signal from any one of the electronic control devices 100B to 100M (i.e., electronic control device other than the electronic control device 100A having been in the sleeping mode), the power saving mode of the electronic control device 100A having been in the sleeping mode is cancelled. Therefore, until various controls by the microcomputers 110 and 120 (i.e., microcomputers included in the electronic control device 100A) become necessary, the sleeping mode of the microcomputers 110 and 120 is maintained. On the other hand, when the various controls by the microcomputers 110 and 120 become necessary, the sleeping mode of the microcomputers 110 and 120 is cancelled, and thereafter the microcomputers 110 and 120 perform the controls as required to do. Accordingly, the electronic control devices 100A and 100B to 100M retain the demanded functions while retaining the time necessary for shifting to the power saving mode and reducing the power consumption.

(7) At the time of cancelling the power saving mode, based on the input of the signal from the control target that the first microcomputer 110 controls, the sleeping mode of the microcomputer 110 into which the signal is input is cancelled. Subsequently, the sleeping mode of the communication bus driver 130 and the sleeping mode of the second microcomputer 120 into which no signal is input from the control target are cancelled. Therefore, once the signal is input into the first microcomputer 110 from the control target, the sleeping modes of the first microcomputer 110, the communication bus driver 130 and the second microcomputer 120 are suitably cancelled, so that various controls are performed based on the signal input from the control target. Accordingly, while the sleeping modes of the microcomputers 110 and 120 are cancelled at the right timing, the microcomputers 110 and 120 whose sleeping modes have been cancelled smoothly perform the various controls.

(8) At the time of cancelling the power saving mode of the electronic control device 100A, based on the input of the signal transmitted from any one of the electronic control devices 100B to 100M (i.e., electronic control device other than the electronic control device 100A), the sleeping mode of the communication bus driver 130 is cancelled. Subsequently, the sleep modes of the all of the microcomputers 110 and 120 are cancelled. Therefore, when the voltage is changed in the BS communication line BS1 due to the signal transmitted from the other electronic control devices 100B to 100M, the sleep modes of the communication bus driver 130 and the microcomputers 110 and 120 included in the electronic control device 100A are suitably cancelled, and the electronic control device 100A performs various controls in accordance with the signal input from the control target. Accordingly, while the sleeping modes of the microcomputers 110 and 120 are cancelled at a right timing, the microcomputers 110 and 120 whose sleeping modes are cancelled more smoothly perform the various controls.

(9) As the electronic control device, the electronic control devices 100A to 100M, which are adapted to transmit and receive signals via the vehicle network installed in the vehicle C, are exemplified. Therefore, the shifting to the sleeping mode of the microcomputers 110 and 120 included in the electronic control devices 100A to 100M, and the cancelling of the sleeping mode of the same are also applicable to the electronic control devices 100A to 100M installed in the vehicle C. Accordingly, while the power consumption of the electronic control devices 100A to 100M is reduced, various signals are smoothly exchanged via the shared communication bus driver 130.

The embodiment described above may be modified as follows.

At the time of shifting to the power saving mode, the logic level of the standby terminals 112 and 122, which has been changed to "L", is changed to the high impedance after the communication bus driver 130 shifts to the sleeping mode. However, the configuration is not limited thereto, and as long as the operation of the communication bus driver 130 after cancelling the power saving mode is secured, the logic level of the standby terminals 112 and 122 may be maintained to be continuously "L".

At the time of cancelling the power saving mode of the electronic control device 100A, the sleeping mode of the communication bus driver 130 is cancelled based on the input of a signal from any one of the electronic control devices 100B to 100M (i.e., electronic control device other than the electronic control device 100A). Then, the sleep modes of all the microcomputers 110 and 120 are cancelled simultaneously. However, the configuration is not limited thereto, and after the sleeping mode of the communication bus driver 130 is cancelled, the sleeping modes of the microcomputers 110 and 120 may be sequentially cancelled. Alternatively, after the sleeping mode of the communication bus driver 130 is cancelled, the sleeping modes of the microcomputers 110 and 120 may be cancelled after lapse of a predetermined time.

At the time of cancelling the power saving mode, based on the input of the signal from the control target that the first microcomputer 110 controls, the sleeping mode of the microcomputer 110 into which such signal is input is cancelled. Subsequently, the sleeping mode of the communication bus driver 130, and the sleeping mode of the second microcomputer 120 into which no signal is input from the control target are cancelled. The sleeping mode of the second microcomputer 120 may be likewise configured to, when a signal is input from the control target that the second microcomputer 120 controls, be cancelled based on the input of such signal. Then, the sleeping mode of the communication bus driver 130 and the sleeping mode of the microcomputer 110 into which no signal is input from the control target may be configured to be cancelled. Further, the electronic control device may employ a configuration where: the sleeping mode of the first microcomputer 110 is cancelled when inputting a signal from the control target that the microcomputer 110 controls; and the sleeping mode of the second microcomputer 120 is cancelled when inputting a signal from the control target that the second microcomputer 120 controls. In addition to the above, the electronic control device may set as desired the process and timing for switching the sleeping microcomputers 110 and 120 and the communication bus driver 130 to the wake-up modes.

When a signal is input from the control targets that the microcomputers 110 and 120 control, the sleeping modes of the microcomputers 110 and 120 are cancelled. Further, when the communication bus driver 130 receives a signal transmitted from any one of the electronic control devices 100B to 100M (i.e., electronic control device other than the sleeping electronic control device 100A), the power saving mode of the electronic control device 100A, which is in the sleeping mode, is cancelled. However, the configuration is not limited thereto, and for instance, the microcomputers 110 and 120 or the electronic control device 100A may input a signal indicating of the changes in the vehicle conditions of the vehicle C, and the sleeping modes of the microcomputers 110 and 120 and the communication bus driver 130 may be cancelled based on such input signal. Alternatively, for instance, the sleeping modes of the microcomputers 110 and 120 and the communication bus driver 130 may be configured to be cancelled upon the lapse of a predetermined time after any one of the microcomputers 110 and 120 and the communication bus driver 130 has shifted to the sleeping mode.

The microcomputers 110 and 120 are connected with each other by the dedicated communication line 140, and the microcomputers 110 and 120 are each controlled to monitor the other one of the microcomputers 110 and 120 sharing the same communication bus driver 130, based on the information transmitted through the dedicated communication lines 140, 142 and 143. However, the configuration is not limited thereto, and any configuration may be employed as long as the microcomputers 110 and 120 are capable of receiving the data frame transmitted from the microcomputers 120 and 110. For instance, the communication bus driver 130 may be configured to transmit the data frame transmitted from the microcomputers 110 and 120, and the data frame received by the communication bus driver 130 may be transferred to the microcomputers 120 and 110 from the communication bus driver 130. Likewise, the communication bus driver 130 may be configured to monitor the operation conditions of the microcomputers 110 and 120, and to transmit from the communication bus driver 130 the signal indicating of the monitor results to the microcomputers 120 and 110.

When the microcomputers 110 and 120 make the sleep requests simultaneously, the standby terminals 112 and 122 of the microcomputers 110 and 120 are switched to the "L" logic level simultaneously. However, the configuration is not limited thereto, and if the microcomputers 110 and 120 make the sleep requests simultaneously, either one of the standby terminals 112 and 122 of the microcomputers 110 and 120 may be set to the high impedance, and thereafter the other one of the standby terminals 122 and 112 may be set to the "L" logic level.

At the time of shifting to the power saving mode, the standby terminal 112 of the first microcomputer 110, which has first made the sleep request, is switched to the high impedance, and thereafter the standby terminal 122 of the second microcomputer 120, which is the microcomputer that lastly shifts to the sleeping mode, is switched to the "L" logic level. However, the configuration is not limited thereto, and any configuration is employable, as long as the communication bus driver 130 is switched to the sleeping mode after all the microcomputers 110 and 120 included in the electronic control device 100A have shifted to the sleeping mode. The setting details of the standby terminals 112 and 122 may be suitably changed.

The microcomputers 110 and 120 are respectively provided with the standby terminals 112 and 122 whose conditions are selectively set to "H" logic level, "L" logic level or high impedance in relation to the communication bus driver 130, and when either one of the standby terminals 112 and 122 of the microcomputers 110 and 120 is set to the "L" logic level, the communication bus driver 130 shifts to the sleeping mode. However, the configuration is not limited thereto, and any configuration may be employed as long as the communication bus driver 130 shifts to the sleeping mode in accordance with the shifting of both the microcomputers 110 and 120 to the sleeping mode.

The power saving mode is defined as a mode where the microcomputers 110 and 120 included in the electronic control device 100A and the communication bus driver 130 are all in the sleeping mode. However, the definition is not limited thereto, and the power saving mode may be a mode where any one of: the microcomputers 110 and 120 included in the electronic control device 100A; and the communication bus driver 130 is in the sleeping mode.

The electronic control devices 100A and 100B to 100M are each configured to include the communication bus driver 130 and the two microcomputers 110 and 120 sharing the same communication bus driver 130. However, the configuration is not limited thereto, and the electronic control devices 100A and 100B to 100M each may be configured to include three or more microcomputers sharing the same communication bus driver 130. Even with this configuration, when all the microcomputers included in the electronic control device have shifted to the sleeping mode, the communication bus driver 130 shifts to the sleeping mode. Thus, until all the microcomputers shift to the sleeping mode, the microcomputers in the wake-up mode are maintained to be communicable.

As the vehicle network, a CAN is employed. In addition to CANs, the vehicle network may be suitably modified, and may be any network as long as such network serves as the communication method for the electronic control device having the microcomputers sharing the same communicator.

As the electronic control device, the electronic control devices 100A to 100M installed in the vehicle C and adapted to control the respective control targets are employed. However, the electronic control device is not limited thereto, and the electronic control device may be any electronic control device as long as such electronic control device includes the microcomputers sharing the same communicator, such as an electronic control device installed in various information terminals or various devices and adapted to control the control targets. Even with this configuration, the microcomputers for which the sleep requests are made are switched to the sleeping mode while the microcomputers in the wake-up mode are maintained to be communicable. In this manner, the power consumption is reducible while favorably maintaining the communication function of the electronic control device.

DESCRIPTION OF THE REFERENCE NUMERALS 100A to 100M . . . electronic control device, 100N . . . gateway, 110 . . . first microcomputer, 111 . . . communication controller, 112 . . . standby terminal, 113 . . . wake-up terminal, 120 . . . second microcomputer, 122 . . . standby terminal, 123 . . . wake-up terminal, 130 . . . communication bus driver, 131 . . . communication controller, 132 . . . standby terminal, 133 . . . wake-up terminal, 140, 141, 142, 143 . . . communication line, C . . . vehicle, BS1 to BS3, BS1$a$, BS1$b$ . . . communication line

The invention claimed is:

1. An electronic control device, comprising a plurality of microcomputers, wherein the electronic control device communicates with other devices through communication lines, wherein
the microcomputers share a communicator, which is provided between the microcomputers and the communication lines and adapted to transmit and receive signals,
a power saving mode is performed to reduce power consumed by the electronic control device, wherein the power saving mode is a mode during which any of the microcomputers that have made a sleep request are switched to a sleeping mode, and the communicator is switched to the sleeping mode after all the microcomputers have shifted to the sleeping mode,
each of the microcomputers includes a standby terminal whose condition is selectively set to "H" logic level, "L" logic level or high impedance in relation to the communicator, and
the communicator shifts to the sleeping mode when any one of the standby terminals of the microcomputers is set to the "L" logic level.

2. The electronic control device according to claim 1, wherein the microcomputers shifting to the sleeping mode switch outputs of the standby terminals to the high impedance at the time of shifting to the power saving mode.

3. The electronic control device according to claim 2, wherein at the time of shifting to the power saving mode, after the standby terminals of the microcomputers are sequentially switched to the high impedance, the standby terminal of the microcomputer that lastly shifts to the sleeping mode is switched to the "L" logic level.

4. The electronic control device according to claim 2, wherein at the time of shifting to the power saving mode, if the microcomputers shift to the sleeping mode simultaneously, the standby terminals of the microcomputers are switched to the "L" logic level simultaneously as a special exception.

5. The electronic control device according to claim 3, wherein
the microcomputers are connected with one another by a dedicated communication line and adapted to transmit through the dedicated communication line information indicative of shifting to the sleeping mode,
each of the microcomputers monitors operation conditions of the other microcomputers sharing the communicator based on the information transmitted through the dedicated communication line, and
based on the monitored operation conditions, each of the microcomputers determines whether the same microcomputer is required to set the standby terminal of the same microcomputer to the high impedance or to the "L" logic level at the time of shifting to the sleeping mode.

6. The electronic control device according to claim 1, wherein
when a signal is input from control targets that the microcomputers control, the sleeping mode of the relevant microcomputers is cancelled, and
when the communicator receives a signal transmitted from an electronic control device different from the electronic control devices remaining in the sleeping mode, the power saving mode of the electronic control devices remaining in the sleeping mode is cancelled.

7. The electronic control device according to claim 6, wherein at the time of cancelling the power saving mode, based on input of a signal from a control target that any one of the microcomputers controls, the sleeping mode of the microcomputers that have input the signal is cancelled, and thereafter the sleeping mode of the communicator and the sleeping mode of the microcomputers that have not input the signal from the control target are cancelled.

8. The electronic control device according to claim 6, wherein at the time of cancelling the power saving mode, after the sleeping mode of the communicator is cancelled based on input of a signal from the different electronic control device, the sleeping mode of all the microcomputers is cancelled.

9. A method of controlling a plurality of microcomputers included in an electronic control device adapted to conduct communication with other devices, the method comprising:
causing the microcomputers to share a communicator provided between communication lines and adapted to transmit and receive a signal; and switching the electronic control device to a power saving mode during which power consumed by the electronic control device is reduced, wherein the switching of the electronic control device to the power saving mode includes:

a first step during which microcomputers for which sleep requests are made are switched to sleeping mode; and a second step during which the communicator is switched to the sleeping mode after all the microcomputers have shifted to the sleeping mode, wherein the method further includes:

providing each of the microcomputers with a standby terminal whose condition is selectively set to "H" logic level, "L" logic level or high impedance in relation to the communicator; and shifting the communicator to the sleeping mode when any one of the standby terminals of the microcomputers is set to the "L" logic level.

10. The method of controlling microcomputers according to claim 9, wherein the first step includes:

sequentially switching the standby terminals of the microcomputers to the high impedance; and switching the standby terminal of the microcomputer that lastly shifts to the sleeping mode to the "L" logic level.

11. The method of controlling microcomputers according to claim 9, wherein the first step includes switching the standby terminals of the microcomputers to the "L" logic level simultaneously as a special step for switching the microcomputers to the sleeping mode simultaneously.

12. The method of controlling microcomputers according to claim 10, wherein the microcomputers are connected with one another by a dedicated communication line and adapted to transmit through the dedicated communication line information indicative of shifting to the sleeping mode, each of the microcomputers monitors operation conditions of the other microcomputers based on the information transmitted through the dedicated communication line, and based on the monitored operation conditions, each of the microcomputers determines whether the same microcomputer is required to set the standby terminal of the same microcomputer to the high impedance or to the "L" logic level at the time of shifting to the sleeping mode.

13. The method of controlling microcomputers according to claim 9, further comprising:

cancelling the sleeping mode of the microcomputers when a signal is input from control targets that the microcomputers control; and cancelling the power saving mode of the electronic control devices remaining in the sleeping mode when the communicator receives a signal transmitted from an electronic control device different from the electronic control devices remaining in the sleeping mode.

14. The method of controlling microcomputers according to claim 13, wherein the cancelling of the sleeping mode of the microcomputers sequentially:

cancels the sleeping mode of a microcomputer that has input a signal from a control target that any one of the microcomputers controls, based on the input of the signal; and cancels the sleeping mode of the microcomputers that have not input the signal from the control target.

15. The method of controlling microcomputers according to claim 14, wherein the cancelling of the power saving mode sequentially:

cancels the sleeping mode of the communicator based on input of a signal from the different electronic control device; and cancels the sleeping mode of all the microcomputers.

* * * * *